(12) United States Patent
Maher

(10) Patent No.: US 12,474,684 B2
(45) Date of Patent: Nov. 18, 2025

(54) CONNECTED DEVICE INFORMATION MANAGEMENT SYSTEMS AND METHODS

(71) Applicant: Intertrust Technologies Corporation, Berkeley, CA (US)

(72) Inventor: David P. Maher, Philadelphia, PA (US)

(73) Assignee: Intertrust Technologies Corporation, Berkeley, CA (US)

( * ) Notice: Subject to any disclaimer, the term of this patent is extended or adjusted under 35 U.S.C. 154(b) by 141 days.

(21) Appl. No.: 18/475,192

(22) Filed: Sep. 26, 2023

(65) Prior Publication Data

US 2024/0019830 A1   Jan. 18, 2024

Related U.S. Application Data

(63) Continuation of application No. 16/843,705, filed on Apr. 8, 2020, now Pat. No. 11,803,169.

(60) Provisional application No. 62/831,489, filed on Apr. 9, 2019.

(51) Int. Cl.
  *G06Q 50/06*    (2024.01)
  *G05B 19/042*   (2006.01)
  *H02J 13/00*    (2006.01)
  *H04L 9/40*     (2022.01)

(52) U.S. Cl.
  CPC .......... *G05B 19/042* (2013.01); *G06Q 50/06* (2013.01); *H02J 13/00006* (2020.01); *G05B 2219/2639* (2013.01)

(58) Field of Classification Search
  None
  See application file for complete search history.

(56) References Cited

U.S. PATENT DOCUMENTS

| | | | |
|---|---|---|---|
| 8,156,055 B2 | 4/2012 | Shimada |
| 8,260,471 B2 | 9/2012 | Storch |
| 9,117,251 B2 | 8/2015 | Schmidt |
| 9,146,548 B2 | 9/2015 | Chambers |
| 9,692,879 B1 | 6/2017 | Lack |
| 10,191,972 B2 | 1/2019 | Maher |

(Continued)

FOREIGN PATENT DOCUMENTS

CN   108681950   10/2018

OTHER PUBLICATIONS

Jun. 18, 2020 PCT/US2020/027336 International Search Report (5 pgs).

(Continued)

*Primary Examiner* — Raqiul A Choudhury
(74) *Attorney, Agent, or Firm* — John P. Davis; Thayne and Davis LLC

(57) ABSTRACT

The disclosure relates to systems and methods for managing data generated by connected systems and/or devices in connection with energy usage and/or management decisions. In certain embodiments, a gateway device in communication with one or more connected devices may be configured to receive energy management signal information and apply one or more policies in connection with the management of the connected devices. Responses generated in connection with such energy management decisions may be reported securely in a manner that respects various stakeholder concerns relating to transparency, confidentiality, privacy, auditability, and/or affirmation of data provenance.

15 Claims, 5 Drawing Sheets

(56) References Cited

U.S. PATENT DOCUMENTS

| | | | |
|---|---|---|---|
| 10,281,508 B2 | 5/2019 | Hwang | |
| 10,861,112 B2 | 12/2020 | Forbes, Jr. | |
| 11,017,883 B1* | 5/2021 | Escala | G16H 10/40 |
| 2003/0084108 A1 | 5/2003 | Syed | |
| 2004/0093499 A1 | 5/2004 | Arditi et al. | |
| 2005/0033707 A1* | 2/2005 | Ehlers | F24F 11/30 |
| | | | 705/412 |
| 2008/0052253 A1 | 2/2008 | Edwards | |
| 2009/0157835 A1 | 6/2009 | Thompson | |
| 2010/0138363 A1 | 6/2010 | Batterberry et al. | |
| 2010/0293049 A1 | 11/2010 | Maher et al. | |
| 2012/0245749 A1* | 9/2012 | Littrell | H02J 3/144 |
| | | | 700/291 |
| 2012/0266209 A1 | 10/2012 | Gooding et al. | |
| 2013/0268135 A1* | 10/2013 | Simonov | H02J 13/00002 |
| | | | 702/62 |
| 2013/0345884 A1* | 12/2013 | Forbes, Jr. | H02J 13/00028 |
| | | | 700/286 |
| 2014/0351285 A1 | 11/2014 | Liu | |
| 2015/0134570 A1 | 5/2015 | Pratt et al. | |
| 2015/0221152 A1 | 8/2015 | Andersen | |
| 2015/0280923 A1 | 10/2015 | Camenisch | |
| 2015/0319142 A1 | 11/2015 | Herberg et al. | |
| 2016/0116933 A1* | 4/2016 | Craig | G05F 1/66 |
| | | | 700/295 |
| 2016/0358397 A1 | 12/2016 | Kristensen | |
| 2018/0084412 A1 | 3/2018 | Alfred | |
| 2019/0058599 A1 | 2/2019 | Takada Chino | |
| 2019/0190270 A1 | 6/2019 | Gersch | |
| 2019/0199129 A1 | 6/2019 | Kobayashi et al. | |
| 2019/0349426 A1 | 11/2019 | Smith | |
| 2019/0353685 A1 | 11/2019 | Almeida Cavoto | |
| 2020/0035341 A1 | 1/2020 | Kain | |
| 2020/0127812 A1 | 4/2020 | Schuler | |
| 2020/0275166 A1 | 8/2020 | Jordan | |
| 2020/0326679 A1 | 10/2020 | Maher | |

OTHER PUBLICATIONS

Jun. 18, 2020 PCT/US2020/027336 Written Opinion (9 pgs).

EPO Machine Translation: CN108681950 by Jiangsu, published Oct. 19, 2018 (14 pgs).

U.S. Appl. No. 16/843,705, Notice of Allowance, dated Jun. 26, 2023.

U.S. Appl. No. 16/843,705, Non-Final Office Action, dated Jan. 5, 2022.

U.S. Appl. No. 16/843,705, Final Office Action, dated May 19, 2022.

U.S. Appl. No. 16/843,705, Non-Final Office Action, dated Nov. 8, 2022.

Examination Report 1 from IP Australia issued in Australian Application No. 2020271070 dated Feb. 21, 2024.

Examination Report 2 from IP Australia issued in Australian Application No. 2020271070 dated Sep. 19, 2024.

Examination Report 3 from IP Australia issued in Australian Application No. 2020271070 dated Feb. 14, 2024.

English Language Translation of Office Action issued by the Japanese Patent Office in Japanese Application No. 2021-560531 dated Mar. 29, 2024.

EP Application 20723656.3-1222—Communication Pursuant to Rules 161(1) and 162 EPC dated Nov. 16, 2021.

* cited by examiner

CONNECTED DEVICE INFORMATION MANAGEMENT SYSTEMS AND METHODS

RELATED APPLICATIONS

This application is a continuation of U.S. patent application Ser. No. 16/843,705, filed Apr. 8, 2020, and entitled "CONNECTED DEVICE INFORMATION MANAGEMENT SYSTEMS AND METHODS," which claims the benefit of priority under 35 U.S.C. § 119(e) to U.S. Provisional Application No. 62/831,489, filed Apr. 9, 2019, and entitled "TRANSACTIONAL ENERGY SYSTEMS AND METHODS," both of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing data generated by one or more one or more connected systems and/or devices. More specifically, but not exclusively, the present disclosure relates to managing data generated by connected systems and/or devices in connection with energy usage, management, and/or pricing decisions.

Energy generation, utilization, and/or pricing may vary widely over time based, at least in part, on demand conditions. For example, during hot summer days, air conditioning requirements may increase the demands placed on the electrical grid and the associated usage of electricity, thereby increasing the pricing of electricity during these periods. Similarly, energy pricing may increase during winter evenings when home lighting and/or inductive heating loads increase. In certain instances, electricity pricing may be set for periods that can be as short as five minutes based on applicable demand and/or generation conditions.

Electric and/or other utility providers may use automated demand management techniques to help smooth highly variable pricing and/or demand curves. Conventional automated demand response ("ADR") systems may be provided to customers and are often installed at a customer's business and/or residence in connection with a higher demand load to better manage the use of such loads in consideration of overall utility demand. Many ADR systems may engage in a specified action based on automated control signaling received directly from a utility provider. For example, an ADR system may be installed in connection with a residential air conditioning system, a laundry dryer system, and/or the like. Typically, such an ADR systems comprise discrete systems and/or devices separate from but otherwise providing power to a single associated load.

When certain energy pricing, demand, and/or generation thresholds are reached by the utility, the utility may send a signal to an ADR system to engage in a control action. For example, the utility may signal an ADR system to reduce output from and/or otherwise turn off an associated air conditioning system, to turn off an associated laundry dryer unit, and/or the like. In this manner, a utility may temporarily reduce demand by directing certain loads to power off and/or otherwise change a setting and/or configuration. Once installed, however, typical ADR systems do not afford customers control over ADR decisions, much less granular control.

Many consumer and/or commercial devices are becoming progressively more interconnected. For example, a variety of Internet-connected devices are now available to consumers as part of a connected device ecosystem that utilizes the existing Internet infrastructure that in some instances may be referred to as the Internet of Things ("IoT") and/or the Internet of Everything ("IoE"). This ecosystem may provide connectivity that makes a variety of computing devices (i.e., things) and/or groups of devices more useful.

Various industrial systems and devices are also becoming increasingly interconnected. For example, wind turbines (e.g., arrays of wind turbines included in a wind farm), solar panels and/or arrays, and/or energy storage devices may be communicatively connected with other network devices. Connected systems and devices in the IoT may also allow for the collection of unprecedented amounts of data relating to the systems and/or their associated users, thereby facilitating an understanding of environments, user behaviors, and/or how well various systems and/or devices perform.

Systems and methods disclosed herein facilitate the collection and/or analysis of various data generated by one or more connected systems and/or devices and the control and/or automation of various systems and/or devices responsive to energy management signal information, thereby improving the interaction between interconnected systems and/or devices. Certain embodiments may be applied in connection with a retail energy transaction ecosystem, although embodiments of the disclosed systems and methods may be further used in a variety of other suitable applications, contexts, and/or ecosystems. In some embodiments, various aspects of the disclosed systems and methods may allow an energy retailer to transmit energy pricing data and/or associated information to customers. Customers may use this information to, among other things, alter their home energy consumption configurations, explicitly and/or implicitly accepting pricing for energy they consume over a specific period of time.

Various aspects of the disclosed embodiments may further allow a retailer to adjust (e.g., adjust in the aggregate, by group and/or region, etc.) system energy load (e.g., global consumption) and/or to predict future consumption and/or elasticity of demand. That is, some embodiments may gather information to help optimize energy retailer income and/or costs by predicting demand in response to pricing options offered to consumers. Certain embodiments of the disclosed systems and methods may further satisfy the informational needs of multiple stakeholders, including energy retailers, suppliers, consumers, and/or regulators. In some embodiments, data record bifurcation techniques may be used to reconcile various stakeholder concerns relating to transparency, confidentiality, privacy, auditability, and/or affirmation of data provenance.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
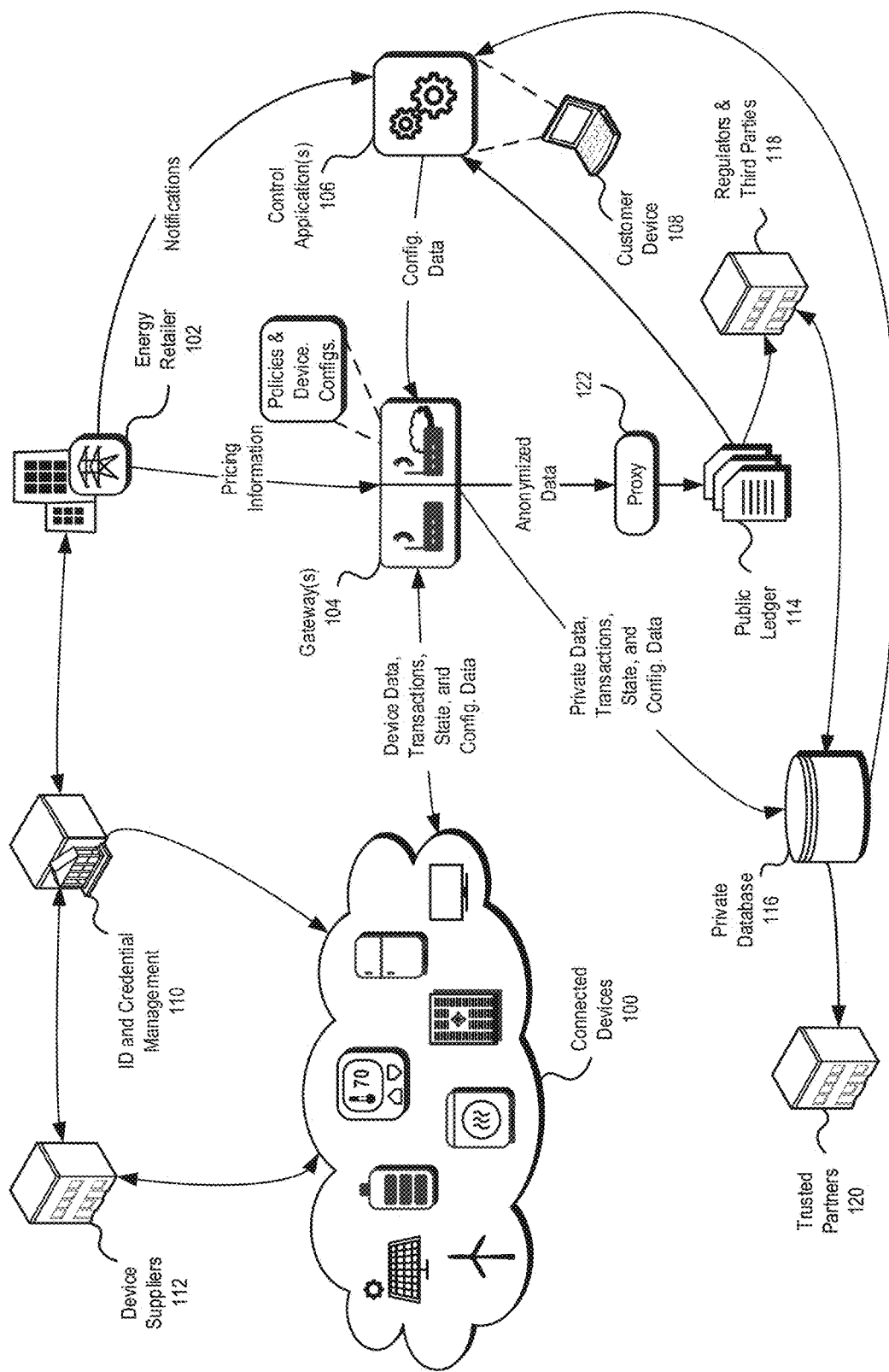
FIG. 1 illustrates a data management ecosystem consistent with certain embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Systems and methods disclosed herein facilitate the collection and/or analysis of various data generated by one or more connected systems and/or devices and the control and/or automation of various systems and/or devices. Certain embodiments are described in connection with an energy management and transaction ecosystem, although various aspects of the disclosed systems and methods are not so limited in application. Indeed, aspects of the disclosed systems and methods may be used in connection with a variety of other suitable applications, contexts, and/or ecosystems including, for example and without limitation, medical and/or bioinformatics applications.

Various embodiments may allow an energy retailer to transmit energy pricing data and/or associated information to consumer devices that may use this information to, among other things, alter their energy consumption, change their configuration, and/or the like. In some embodiments, an energy retailer may communicate information to connected devices that the devices may use to adjust (e.g., adjust in the aggregate, by group and/or region, etc.) utility system energy loads and/or consumption and/or to predict future consumption. This may, among other things, help smooth highly variable energy pricing and/or demand curves.

In certain embodiments, information may be collected and communicated to energy retailers and/or other stakeholders to help optimize energy retailer income and/or costs by predictive demand and/or consumer response modeling. In various embodiments, certain confidential, protected, secured and/or otherwise private information may be separated from less confidential, less protected, less secure and/or more public information for storage and/or management. In some implementations, separating less secure and/or confidential data (e.g., public data) from more secure and/or confidential data (e.g., private data) for storage and/or management consistent with aspects of the disclosed embodiments may facilitate a system that provides transparency, confidentiality, privacy, and/or auditability.

In connection with an energy transaction management system, embodiments of the disclosed systems and methods may, among other things, be:

Responsive—Consumers may react to pricing with relatively minimal latency, and retailers may obtain detailed, load and/or device differentiated (e.g., differentiated at the device level and/or by groups of devices), storage, and/or production information.

Transparent and/or Auditable—Information that is publicly available and/or available to regulators and/or other stakeholders may be authenticated and/or auditable. For example, stakeholders may trust that data is of authentic origin. In some embodiments, stakeholders may check data against other data for consistency.

Protective of Privacy—Consumer privacy and/or consumer confidential information may be protected.

Protective of Confidentiality—The confidentiality of retailer proprietary information (e.g., pricing information and/or strategies) may be preserved.

Relatively Easy to Integrate—Aspects of the disclosed embodiments may allow for relatively straightforward integration into a variety of connected devices from many manufacturers.

Portable—Various embodiments may be re-sellable and/or portable to a variety of regions either as a service and/or as a combination of licensed technology and/or services. For example, the system architecture and/or data management functions may be adapted to a variety of regulatory environments.

Data Management Ecosystem

FIG. 1 illustrates a data management ecosystem consistent with certain embodiments of the present disclosure. In various embodiments, the ecosystem may include a variety of devices, systems, services, entities, roles, and/or components and/or use a variety of different data objects including some, all, and/or a subset of the various devices, systems, services, entities, roles, components, and/or data objects illustrated and described in connection with FIG. 1 and/or elsewhere herein.

In various embodiments, the disclosed ecosystem may allow for a variety of different kinds of connected devices 100 to be controlled and/or otherwise managed based, at least in part, on signals received from a variety of different entities. Connected devices 100 may, for example, be controlled directly by such entities based on received signals. In further embodiments, connected devices 100 may engage in control actions responsive to signals received from various entities in accordance with one or more policies and/or configurations (e.g., customer-defined policies) enforced by the devices and/or another system associated with the devices.

For example, as discussed in more detail below, an energy retailer 102 and/or another entity may communicate energy management signals, which may comprise pricing information signals (e.g., current pricing, future pricing, discount information, indications of forecasted supply, forecasted loads, forecasted deficits, rates, associated time periods, rate bounds, and/or the like), to one or more connected devices 100 and/or an associated system and/or service such as an associated gateway 104. A customer may articulate configuration policies that, in response to such signals, cause one or more connected devices 100 to engage in one or more specified control actions. For example, a customer may articulate a policy associated with an air conditioning unit and/or an associated connected thermostat directing the air conditioning unit and/or connected thermostat to power down and/or otherwise reduce air conditioning loads when pricing information received from an energy retailer 102 exceeds a certain threshold. In this manner, an energy consumer may better manage the power usage of their connected devices 100, while an energy retailer 102 can better manage pricing and/or incentive programs and grid loads.

Consistent with various embodiments, energy management signals may comprise, for example and without limitation, one or more of:

Pricing information that may include current prices, future prices, pricing schedules, discounts, surcharges, premiums, bounds (e.g., ceilings and/or floors) any/or any other information that might be applied to the consumption, generation, storage (e.g., charging), and/or release (e.g., discharging) of energy by a connected device 100.

Address information that may comprise specific devices (e.g., a device associated with an identifier) and/or device groups and/or classes identified by a group, type, and/or class identifier that may be associated with devices.

Actions and/or names of actions that may directly or indirectly effectuate and/or suggest a response by a specified device and/or by one or more devices that have specific function types and/or are members of one or more classes (e.g., certified classes).

Machine readable statements that may include the above information and/or a subset thereof in predicate and/or propositional form with and/or without conditions.

Informative statements that do not necessarily invoke a response by a device by which might provide information to human and/or artificial intelligence mechanisms.

Connected Devices

The disclosed embodiments may be used in connection with a variety of connected devices 100, systems, or "things". As used herein, the terms device, connected device, and/or thing may, in certain instances, be used interchangeably. Embodiments of the disclosed systems and methods may be implemented in connection with a diverse ecosystem of connected devices 100 associated with an individual, their home, their vehicle, their workplace, a commercial and/or industrial setting, and/or the like. Embodiments of the disclosed systems and methods may be used in connection with a variety of connected devices 100 including, for example and without limitation, thermostats, heating (e.g., furnaces), ventilating, and air conditioning ("AC") systems, irrigation systems, water controls, pumps, heaters, home utility meters, home network gateways, activity sensors, connected home appliances (e.g., refrigerators, washing machines, laundry drivers televisions, etc.), media devices (e.g., televisions), connected vehicles, connected energy storage systems (e.g., batteries and/or devices that include batteries), connected energy generation systems, and/or any other connected device, as well as associated data stores.

Connected devices 100 may be associated with a variety of functional categories and/or attributes including, for example and without limitation, control functions, loads (e.g., energy consuming devices), generators (e.g., energy producing devices), and/or storage (e.g., batteries and/or the like). Other functional categories and/or attributes of devices may further include, for example and without limitation, timers, status checkers, status indicators, alarms, alarm thresholds, and/or sensor thresholds.

Connected devices 100 may comprise devices that consume electricity. In some instances herein, connected devices 100 that consume energy may be referred to as load devices. Further connected devices 100 may comprise devices that generate electricity such as, for example and without limitation, residential and/or commercial solar panel arrays, wind turbine generators, hydroelectric generators (e.g., micro-hydro systems), and/or any other type of electricity generation system. Connected devices 100 may also comprise devices capable of storing electrical energy such as, for example and without limitation, residential and/or commercial battery storage systems, thermal sinks, potential energy generators, and/or the like. In some embodiments, batteries and/or other energy storage devices included in subsystems of another system such as, for example and without limitation, a battery system included in a vehicle, may further be used in connection with storing electrical energy, and therefore be considered as a connected device. In some embodiments, a group of connected devices 100 may comprise electricity consuming, generation, and/or storage devices that together form a micro-grid associated with a customer.

Certain connected devices 100 may control the operation of other connected devices. For example, a connected thermostat may control the operation of an AC unit. In some embodiments, a device may not necessarily be connected to the Internet and/or a local network but, by virtue of being controlled by a connected device 100, may be operated as a connected device. For example, while some AC units themselves may not include any local and/or Internet network connectivity capability, by virtue of being controlled by a connected thermostat, these units may be managed as connected devices.

While certain embodiments and/or examples are described herein in connection with specific types of connected devices 100 in a residential setting, it will be appreciated that a variety of other connected systems and devices may be used in connection with the disclosed systems and methods in a variety of other settings and/or contexts (e.g., a commercial contexts such as a factory, a business complex, and/or the like), and that any suitable type of connected system and/or device in any suitable setting and/or context may be used in connection with the various disclosed embodiments.

Energy Management Signals and Associated Information

As described above, an energy retailer 102 may generate energy management signals. Energy management signals may include, for example and without limitation, pricing data and/or associated information (e.g., current pricing data, future pricing data, discount information, rate bounds, and/or the like), indications of forecasted supply, forecasted loads, forecasted deficits, rates, time periods, and/or any other type of energy management signal.

Pricing information may include, for example and without limitation, current energy pricing information, future energy pricing information, energy pricing schedules, discounts, surcharges (e.g., surcharges for consuming energy over an agreed upon amount), premiums (e.g., premiums offered if contributing power from storage), and/or pricing bounds (e.g., price ceilings and/or floors that might be applied to consumption, generation, storage (e.g., charging), and/or release (e.g., discharging) of energy by one or more connected devices 100. A conditional discount included in pricing information may be offered in response to a connected device 100 engaging in a particular control action such as reducing consumption or storing energy. Similarly surcharges may be included in pricing information if power is consumed over an agreed upon amount and/or or premiums may be articulated in pricing information offered if devices contribute power from storage.

In some embodiments, such pricing data may vary over time based, for example, on current and/or predicted grid demand. For a variety of reasons, an energy retailer 102 may be interested in smoothing out widely variable pricing and/or demand curves, and pricing data may be tailored and changed over time by the energy retailer 102 to help achieve this goal. Various embodiments may allow the energy retailer 102 to transmit energy pricing data and/or associated information to connected devices 100 (e.g., either directly and/or via one or more customer gateways 104) that may use this information to, among other things, alter their energy consumption, alter their energy generation, alter their energy storage, change their configuration and/or settings, control characteristics relating to energy consumption, generation, and/or storage including changing associated control thresholds, and/or the like.

In certain embodiments, energy management signals including pricing data and/or associated information may include information that allows customers and/or their associated connected devices 100 to automatically and/or optimally respond to pricing and/or other energy management signals based on customer configured preferences and/or policies. For example, in at least one non-limiting example, pricing data may comprise a specified price for energy for a specified period of time. Pricing information may further comprise one or more discounts, which may be conditional and/or otherwise dependent on the one or more connected devices 100 engaging in a specified action (e.g., entering a low power mode, powering off, adjusting a control and/or operational setting, discharging energy from a storage system into the grid, providing generated energy to the grid, storing energy from the grid, and/or the like).

Embodiments disclosed herein may allow the energy retailer 102 to bill a customer for energy consumed based on authenticated data received from one or more connected devices 100, in addition and/or alternatively, to metering information received from on-premise network connected meters. The energy retailer 102 may perform certain data analysis based on historical and/or real-time data to better optimizing pricing and/or manage loads and, by extension, control operational costs.

Customer Gateway

Pricing data and/or other associated information, which may be referred to herein in certain instances as energy management signal information, may be communicated from the energy retailer 102 to one or more customer gateways 104. In some embodiments, the pricing information may be authenticated (e.g., via a secure authenticated channel and/or an authenticated object). In certain embodiments, the gateway(s) 104 may comprise one or more trusted components for metering, sensing, communicating and/or performing trusted computations for automating energy consumption and/or storage decisions, collating data, and/or computing secure channels and/or containers for secure data management, and/or the like.

In some embodiments, the gateway 104 may comprise one or more discrete devices that, in certain implementations, may be installed on a customer's premises and be configured to communicate with one or more connected devices 100 and/or the energy retailer 102. For example, in certain embodiments, the gateway 104 may comprise a device (or multiple devices) that is communicatively coupled to a network router associated with a network in communication with the one or more connected devices 100. In further embodiments, the gateway 104 may be cloud-based and/or otherwise be a remote system and/or service performing functions of a gateway as described herein.

In certain embodiments, the functionally of the gateway 104 may be realized by both discrete devices directly in communication with a customer's local network (e.g., a device coupled to a network router) as well as cloud-based remote services. For example, a subset of the connected devices 100 may be managed by a discrete gateway device associated with customer's local network, while another subset of the connected devices 100 may be managed by a cloud-based remote gateway service. In yet further embodiments, a particular connected device may be in communication with and/or otherwise be managed by both a discrete local gateway device and a cloud-based remote gateway service.

In some embodiments, the gateway 104 may function as a protocol convertor to facilitate communication to and from diverse connected devices 100. For example, some connected devices 100 may have more sophisticated reporting capabilities, while others may be simpler. The gateway 104 may be configured to convert information received from and/or communicated to various connected devices 100 to better enable communication between the connected devices 100 and/or with other devices, systems, and/or services.

Consistent with various disclosed embodiments, a customer gateway 104 may receive energy management signals such as pricing information that may comprise secured signals and/or data received via a secure authentication channel and/or an authenticated object, various connected devices 100 configurations, rules, thresholds, and/or other input decisions received from the energy retailer 102 and/or the control application 106, connected device and/or IoT configuration information, and/or any other information used in connection with aspects of the disclosed systems and methods.

The customer gateway 104 may further output control action signals to connected devices 100, decision notifications and/or transaction data to one or more external databases (e.g., a public ledger 114 and/or a private database 116), and/or metered readings (which may or may not be differentiated by device) as either discrete data records and/or time series data delivered to external databases, and/or any other suitable information used in connection with embodiments of the disclosed systems and methods.

In various embodiments, the gateway 104 may, for example:
  Use energy management signal inputs, make decisions on energy usage, and/or configure and/or execute energy charge and/or discharge schedules. This may, in some instances, rely on direct contemporaneous customer input, but may commonly be automated.
  Provide energy use and/or configuration information to external databases (e.g., a public ledger 114 and/or a private database 116).

Send and/or receive signals from connected devices 100 with energy consuming, producing, and/or storage capabilities.

Function more generally as a controller for "scenes" involving multiple devices and/or virtual composite devices. For example, a number of devices may be conveniently aggregated into a unit with a single interface.

Include a reference monitor and/or security association table for the connected devices 100 and/or an associated network. This may allow for a complete IoT security solution that may include, for example, authenticated commands, encrypted sensor and/or device signal fields, and/or the like.

Implement a secure update manager and/or secure software self-defense mechanisms.

As discussed above, connected devices 100 may communicate to and receive a variety of information from the gateway 104 including, for example and without limitation, device data (which may be returned to the gateway 104 as a response to a control action), transaction data (e.g., actions taken by one or more connected devices 100 in response to signals such as pricing information received from the energy retailer 102 in accordance with policy), state data, configuration data, control signals, and/or the like. Device data, as used herein, may comprise any data associated with the one or more connected devices 100 and may relate to the maintenance, control, management, and/or operation of the associated connected devices 100. It will be appreciated that a wide variety of types of transaction data, state data, configuration data, and/or control system data may be generated and/or otherwise associated with connected devices 100 and be communicated to/from the gateway 104, and that any suitable type of data and/or other information associated with the connected devices 100 may be used in connection with the various disclosed embodiments.

In certain embodiments, information, including control signals and/or responses and/or associated device data, may be communicated directly between a connected device and the gateway 104. In further embodiments, a connected device may indirectly communicate with the gateway 104 through another connected device. For example, an air conditioning unit that lacks Internet network connectivity may communicate device data to an associate connected thermostat, which in turn may share the device data associated with and/or generated by the AC unit with the gateway 104.

Customer Control Application

As illustrated in FIG. 1, a customer may interact with the gateway(s) 104 via one or more control applications 106 executing on a customer device 108 (e.g., a computer system, a laptop, a smartphone, and/or the like). In some embodiments, the control application 106 may comprise a web-based browser application accessed by the customer device 108. Using a control application 106, the customer may, for example, provision the connected devices 100 and/or the gateway 104 with configuration data that, in some embodiments, may comprise policy information. The policy information may articulate one or more policies that, in response to specified signals received from the energy retailer 102, may cause one or more connected devices 100 to engage in one or more specified control actions. For example, a customer may articulate a policy associated with an AC unit and/or an associated connected thermostat directing the AC unit and/or connected thermostat to power down and/or otherwise reduce AC loads when pricing information received from an energy retailer 102 exceeds a certain threshold.

Policies and/or other configuration information communicated from the control applications 106 may further comprise gateway configuration information, connected device configuration information, rules, thresholds, and/or any other suitable type of information used in connection with the disclosed systems and methods. In certain embodiments, a customer may be provided with status, controls and/or notifications associated with the connected devices 100 and/or the gateway 104 via the control application 106.

The customer may further receive and/or otherwise interact with notifications and/or other information issued by the energy retailer 102 using the control application 106. For example, in some embodiments, the retailer 102 may provide a customer with retailer supported analytics (e.g., comparison data with other customers and/or the like) for personal home energy use management.

In certain embodiments, one or more connected devices 100 may be configured and/or otherwise controlled directly via the control application 106. In further embodiments, one of more of the connected devices 100 may be configured and/or otherwise controlled by the control application 106 via the gateway 104.

Communication between the control application 106, the gateway 104, and/or any other systems, stores, and/or entities (e.g., the energy retailer 102) may be authenticated and/or otherwise trusted. For example, in some embodiments, the control application 106 may comprise a trusted component with security associations (e.g., bi-authenticated keys that may include, for example, keys that may be used to establish secure authentication channels and/or communicate secure authenticated messages) with the gateway 104, connected devices 100, the energy retailer 102, and/or one or more data stores 114, 116 and/or associated systems. In this manner, communications with the control application 106 may be trusted.

Identification and Credential Management

In certain embodiments, an identification and/or credential management service 110 (or several such services) may be used to issue secure identification information, credentials, and/or keys to one or more connected devices 100, the energy retailer 102, and/or other systems and/or entities within the ecosystem (e.g., a customer device 108 and/or control application 106, gateways 104, regulator and/or other third party systems 118, trusted partner systems 120, etc.). In some embodiments, the identification and/or credential management service 110 may provide system-wide cryptographic key management services that may enable secure peer-to-peer and/or client-server communications, data authentication, secure control of connected devices 100, and/or secure data access permissioning.

In some implementations, the identification and/or credential management service 110 may issue secure identification information, credentials, and/or keys directly to one or more connected devices 100. In further embodiments, the identification and/credential management service 110 may issue secure identification information, credentials, and/or keys to one or more device suppliers 112 which may provision such information, credentials, and/or keys to connected devices 100 (e.g., during manufacture and/or the like).

In certain embodiments, device manufacturers may provision their own secure identification information, credentials, and/or keys directly to the one or more connected devices 100. Such manufacturer provisioned keys may be submitted and/or otherwise registered with a trusted directory service such as the identification and/or credential management service 110. When other parties in the ecosystem make decisions on whether to trust a device as part of their ecosystem, they may contact the trusted directory service. In certain embodiments, the identification and/or credential management service 100 may maintain such a registry of devices in a trusted indelible and/or immutable assertion ledger that may, in some instances, be implemented using a blockchain ledger.

In various embodiments, the identification and/or credential management service 110 may provide authoritative and/or otherwise authenticated classifications and/or attributes for one or more connected devices 100 so that pricing and other energy management information can be addressed to devices that belong to certain classes, groups, and/or have certain attributes. In some embodiments, such information may be used to generate and/or otherwise manage "scenes" involving multiple devices. These classifications can also be used by auditing systems (e.g., regulators and/or third parties 118) that can independently verify that devices or owners of devices or associated entities are entitled to the treatment described in the pricing and other energy management signals.

Consistent with various disclosed embodiments, secure identification information, credentials, and/or keys may be provisioned to trusted components and/or elements included in various connected devices 100, gateways 104, control applications 106, and/or other involved systems and/or services. For example, in certain embodiments, the identification and/or credential management service 110 may support a retailer sponsored multi-vendor device certification program for trusted elements in gateways 104 and/or connected devices 100 so that a wide variety of connected devices can be trusted to accurately and securely report device data, transactions, state, configuration, metering, and/or other trusted information. The use of trusted components and/or elements included in devices and/or systems may facilitate scalability and allow for a measure of trust and reliance on devices and/or systems that include such components and/or elements.

In various embodiments, provisioned secure identification information, credentials, and/or keys may be used to establish secure connections and/or enable secure messaging and/or communication between various devices, systems, services, and/or entities. For example, in some embodiments, messages may be signed with provisioned keys and may be authenticated based on associated secure signatures. Secure messaging, communication, and/or identity management consistent with aspects of the disclosed embodiments may allow for the gateway 104 to trust the integrity and/or authenticity of information received from the one or more connected devices 100, the energy retailer 104, and/or the control application 106. Such techniques may further allow for trust in the integrity and/or authenticity of information communicated from the gateway 104 to one or more other systems (e.g., connected devices 100, data stores 116, 114, and/or the like).

In certain embodiments, the identification and/or credential management service 100 may support rich identifiers and/or credentials that denote roles, capabilities, and/or compliance assertions for systems elements, so that various goals for security, privacy, integrity, and/or the like are achievable. In connection with this, the identification and/or credential management service 110 may, among other things:

Provide identity and/or credentials to various ecosystem devices, services, entities, elements, and components as discussed above.

Allow identities and credentials to be efficiently verified, including the ability to authenticate sources of commands and response data, the trusted handling (e.g., governance) of data, the roles and/or authority of entities that request data and/or make assertions about data and/or the authority of other entities.

Support secure P2P (e.g., among various connected devices 100) and client/server communications capabilities.

Allow for rapid revocation and/or replacement of compromised credentials and be highly renewable.

Allow for the addition of new types of credentials and/or identity assertions as new types of policies emerge.

Support identities for equipment, software, and/or services from multiple suppliers, and/or support a compliance certification system for capabilities for different device types and for the robustness of those capabilities.

Public and Private Data Bifurcation

A variety of information may be received by the gateway 104 including, for example and without limitation, responses, device data, transaction, state, and/or configuration information received from connected devices 100, energy management signals including pricing information received from an energy retailer 102, and/or configuration and/or other policy information from a control application 106 associated with a customer. The gateway 104 may engage in certain control decisions in response to received energy management signals, pricing information, policy and/or configuration information, and/or various other information received from the connected devices 100. For example, the gateway 104 may signal one or more connected devices 100 to engage in a control action (e.g., change a configuration, setting, and/or the like) in response to pricing information received from the energy retailer 102. The gateway 104 may further receive responses from signaled connected devices 100 confirming and/or otherwise indicating whether the connected devices 100 successfully performed the specified control action(s) and/or auxiliary information regarding the device's operational responses to a received signal.

In certain embodiments, the gateway 104 may receive audit history information from one or more connected devices 100 indicating that a control action was performed and/or sustained for a period of time (e.g., sustained and/or otherwise engaged in for specified period of time) and/or that a subset of a specified set of control actions were performed. For example, a connected device comprising an electric vehicle may be triggered by the gateway 104 to store electric energy for a specified period of time and/or to store a specified amount of energy. The vehicle may store the energy for a period of time (e.g., 95% of a specified time period), but subsequently the owner of the vehicle may then need to use the vehicle. Audit history information may be shared with the gateway deice 104 to determine a relative amount and/or degree of compliance with a specified control action.

Information received and/or generated by the gateway 104 responsive to control decisions and/or transmitted from the gateway 104 to connected devices 100 and/or other systems and/or services may be communicated to and/or stored in one or more data stores 114, 116. In some embodiments, such information may be stored as part of an energy management decision record. In certain embodiments, the data stores 114, 116 may be associated with a single system. In further embodiments, the data stores 114, 116 may be distributed in nature across any suitable number of systems.

Consistent with embodiments disclosed herein, a public database, which in some instances and various examples described herein may comprise public ledger 114, and a private database 116 may be employed in connection with a method of bifurcating record information in a consistent way for storage that preserves desired privacy properties and requirements of various stakeholders, while also providing a measure of determining provenance. Although a single private database 116 and public ledger 114 is shown in connection with FIG. 1, it will be appreciated that a number of private databases 116 and public ledgers 114 may be employed in other implementations. For example, a first private database and public ledger may store various device, transaction, state, and/or configuration data from the connected devices 100, gateway 104, and/or the control applications 106 generated based on and/or otherwise associated with pricing information received from a first energy retailer, and a second private database and public ledger may store various device, transaction, state, and/or configuration data from the connected devices 100, gateway 104, and/or the control applications 106 generated based on and/or otherwise associated with pricing information received from a second energy retailer. Moreover, although various embodiments are described herein in connection with a public database comprising a public ledger 114, it will be appreciated that any suitable public database and/or database structure may be used in connection with the disclosed embodiments, including various information stores that do not use a ledger and/or blockchain structure.

In some embodiments, one or more private databases 116 and/or public ledgers 114 may be associated with one or more device suppliers 112 and/or identification and/or credential management services 110. For example, a device supplier 112 may store private customer registration data in a private database and public serial number, configuration, and/or certification data in a public database and/or ledger. Similarly, an identification and/or credential management service 110 may store private certification and/or activation status information that may be associated with a corresponding public database storing associated public information.

The public ledger 114 may comprise a database and/or ledger where authenticated pricing and/or non-confidential and/or otherwise less secure consumption data and/or other statistics and information may be stored and/or accessed. In some embodiments, the public ledger 114 may be designed to support secure and public monitoring and/or auditing of information reported by the gateway 104 without necessarily revealing more private customer and/or retailer information. In certain embodiments, data stored in the public ledger 114 may be securely correlated with data stored in the private database 116. Data provided to the public ledger 114 by the gateway 104 may be anonymized and/or otherwise obfuscated. For example, names, addresses, and/or identifiers may be removed by the gateway 104 prior to reporting the data to the public ledger 114.

The private database 116 may be configured to store more private and/or confidential data. For example, data stored by the private database 116 may comprise more private, confidential, and/or otherwise secure customer and/or retailer specific data including, for example and without limitation, private device and/or pricing data, transaction information (e.g., actions engaged by devices 100 and/or gateways 104 in response to received pricing information in accordance with customer specified policies and/or configurations), state data, configuration data, and/or the like. In certain embodiments, information stored by the private database 116 may be used for billing, analysis of the effectiveness of various pricing and/or energy demand management strategies, predictive capabilities for energy loads, elasticity of demand, device and/or system failures and/or other metrics, and/or the like. In certain embodiments, data stored in the private database 116 may be maintained in a manner such that it is consistently correlated with data stored in the public ledger 114.

In certain embodiments, the private database 116 may allow for sharing of information with credentialed members of different classes of stakeholders including, for example, and without limitation, regulators and/or other third parties 118, trusted partners 120, wholesalers, and/or the like. Such sharing may be achieved in a manner that is respectful of customer privacy rights.

Consistent with various disclosed embodiments, in some implementations, the public ledger 114 may not receive information that directly identifies and/or can be used to directly identify the customer as the source of the information, even though there may be reconciliation between the public ledger 114 and the private database 116 (which may receive such secure information). In certain circumstances, certain consumption patterns and/or device data may be associated with a unique behavior signature of a customer. For example, the identity of unusually large consumer of energy in a relatively small community may be readily identifiable and/or deducible based on information indicating that an otherwise anonymous customer consumes significantly more energy relative to its surrounding community, even if information relating to such consumption does not include any information directly identifying the consumer. Accordingly, additional anonymization may be employed to help protect the privacy of certain data and/or records exposed that may be exposed in the public ledger 114. For example, in some embodiments, a proxy 122 may be employed that may analyze and/or scan for usage patterns in otherwise anonymized data communicated from the gateway 104 to the public ledger 114 that may be used to identify and/or otherwise deduce the identity of an individual customer and respond with additional anonymization and/or obfuscation if needed.

In certain embodiments, trust may be distributed to the one or more gateways 104. Based on the gateways 104 being trusted, stakeholders may rely on the gateway to perform correct computations on correct data and to communicate appropriate information to the public ledger 114 and/or the private database 114.

Figure 2:
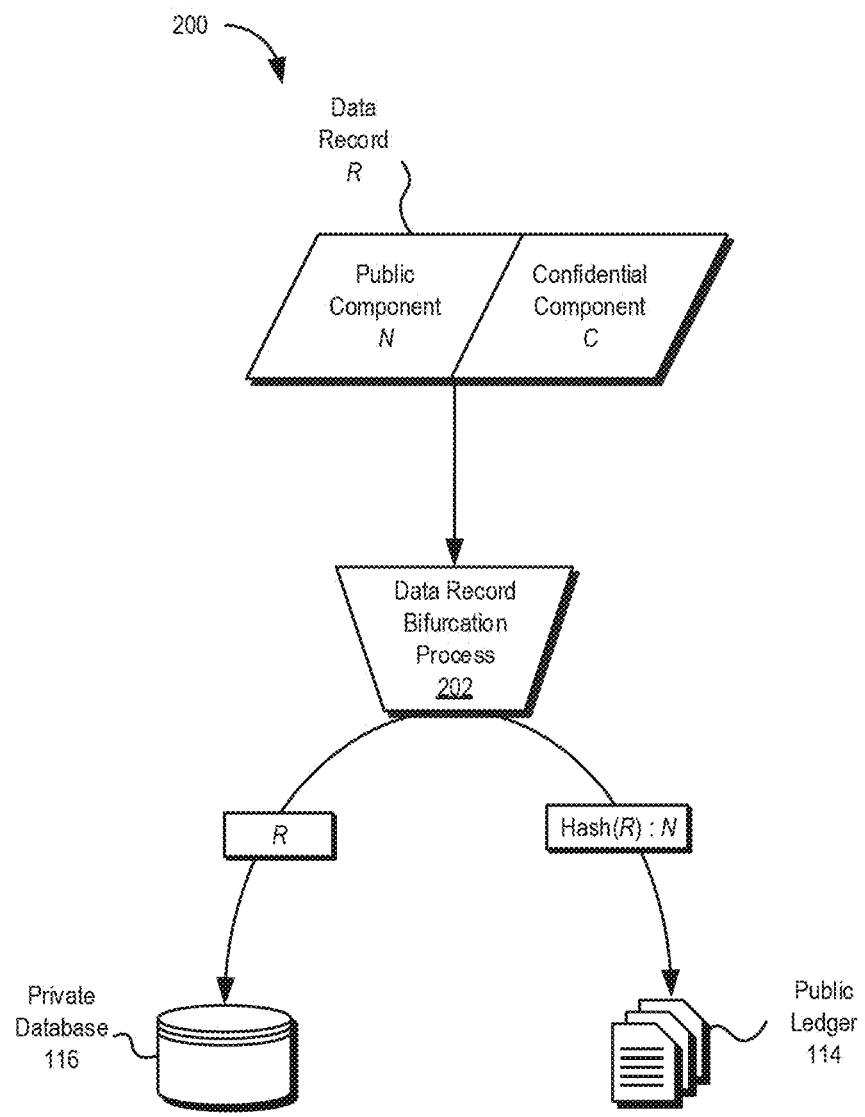
FIG. 2 illustrates a conceptual diagram showing a data bifurcation process consistent with certain embodiments of the present disclosure.

As discussed above, data bifurcation may be used to reconcile various concerns relating to transparency, confidentiality, privacy, auditability, and/or affirmation of data provenance. FIG. 2 illustrates a conceptual diagram 200 showing a data bifurcation process consistent with certain embodiments of the present disclosure. As shown, a data record R may comprise a public component N and a confidential component C. In some embodiments, the data record may comprise a record received and/or otherwise generated by a gateway as described above such as an energy management decision data record. The record R may be denoted as R=(N:C).

A data record bifurcation process 202 may generate a cryptographic hash of the entire data record h(R). The hash of the entire data record along with the public component of the data record (h(R):N) may be transmitted to the public ledger 114 for storage. In certain embodiments, a hash function such as SHA-256 may be used to generate the hash of the data record, although other suitable hashing and/or other cryptographic functions could also be used. The entire data record R may be transmitted to the private database 116 for storage. In some embodiments, the hash of the entire data record h(R) may also be transmitted to the private database 116 and associated with the entire data record R for indexing purposes. In further embodiments, the private database 116 may compute the hash of the entire data record h(R) and be associated with the entire data record R for indexing purposes.

In certain embodiments, the partition schema for the data record R may be known to the private database 116. This may allow a system with permissions to access the private database 116 (e.g., an energy retailer, partners, auditors, regulators, and/or other trusted third parties) to compute the hash and use it for an efficient index in the private database 116 as well as to find records in the public ledger 114.

In certain embodiments, a customer may look up any record it generates in both databases 114, 116, and a regulator, auditor, and/or other trusted third party may continuously and/or longitudinally audit the private database 116 (in certain implementations using automated processes). For example, a trusted regulator, auditor, and/or third party may audit the private database 116 across time and a customer base, checking for consistency against the public ledger 114.

Although various embodiments herein are described in connection with an energy management and transaction ecosystem, aspects of the disclosed systems and methods may be used in connection with a variety of other suitable applications including, for example and without limitation, medical information, health data, and/or bioinformatics applications. For example, embodiments of the disclosed data bifurcation process may be used to manage public and private aspects of health information while balancing private, security, and data integrity and/or auditing goals.

In at least one non-limiting example, a health data record may have certain private data components that include personally identifiable information and less private data components. The private components including the personally identifiable information may be stored in a private database, while less private and/or personal generalized patient demographic information (e.g., age, gender, etc.) and/or other generalized diagnostic information (e.g., positive and/or negative test results for a particular infectious disease) may be stored in a public ledger. Data stored in the private database may be indexed with the information stored in the private database for authorized entities consistent with various aspects of the disclosed embodiments.

Referring back to FIG. 1, in some embodiments, the public ledger 114 may comprise a blockchain and/or other cryptographic ledger. For example, in some embodiments, the public ledger 114 may be anchored in a blockchain using a schema where hashes are entered into Merkle trees and the root of each tree may be recorded in the blockchain ledger. The public ledger 114 may be used to record, for example and without limitation, pricing data received from the energy retailer 102 (which may be the same data received from the energy retailer 102 and/or derived from data provided by the energy retailer 102) including pricing-related signals, thresholds, and/or conditions that may impact customer decisions and/or associate connected device 100 configuration and/or control action decisions (automated decisions or otherwise) and/or any other signals and/or information that may be used in connection with customer decisions and/or associate connected device 100 configuration and/or control action decisions (automated decisions or otherwise). Using hash indexes and blockchain entries may, in some embodiments, provide an authenticated, yet public record of system transactions that may be correlated with the retailer's private records, yet may be used for publicly computed and referenced analytics.

In various embodiments, the functionality of the private database 116 may be spread across and/or otherwise implemented using multiple databases and/or other components. As detailed above, the private database 116 may store one or more of specific detailed customer transaction and/or energy use decision information (with references to the public ledger 114 through a hash index), specific customer energy device confirmation information, and/or digital twins of the gateway 104 and/or connected devices 100.

In some embodiments, information included in the public database 116 may be used by a hosting system to provide data processing capabilities for various customer and/or partner dashboards. For example, if permitted by applicable policy and/or authorization conditions, the customer control application 106, the energy retailer 102, one or more trusted partners 120, and/or trusted regulators and/or third parties 118 may access information included in the private database 116 and/or the public ledger 114 in connection with a variety of data processing and/or analytic processes. For example, a service associated with the private database 116 may host data analytic capabilities for proprietary energy load, production, storage, and/or price elasticity predictions that may be accessed and/or otherwise used by various stakeholders with requisite authorizations. To facilitate such functionality, the private database 116 may implement extensive data governance, access control, and/or policy management capabilities allowing policy-managed access from authorized entities (e.g., authorized customers, retailers 102, trusted partners 120, trusted regulators and/or third party stakeholders 118, and/or the like).

Bifurcating data between a public ledger 114 and a private database 116 with hash indexes that allow reconciliation between the database as described herein, may provide an effective and secure capability supporting several, potentially-conflicting goals, including transparency, privacy, auditability, and/or proper allocation of public and/or proprietary analytics capabilities. By providing a trusted function that stakeholders may rely on without being overly complex and/or otherwise onerous, the reliability demands of the ecosystem may not be significantly greater than that of metering and/or metering notification functions. Bifurcation of data by the gateway 104 may further distribute trust and/or reduce the chance of systematic failure. Using a public ledger 114 for recording public information that is fed directly from customer sources (e.g., connected devices 100 by way of the gateway 104) may add to the credibility afforded by the public and/or by regulators.

Trusted Data Flows and Trusted Components

Consistent with embodiments disclosed herein, communications between various devices, systems, services, entities, roles, components, and/or stakeholders may comprise trusted dataflows. Such trusted dataflows may comprise, for example and without limitation, one or more of:

Energy management signals and/or pricing data communicated from the energy retailer 102 to the gateway 104 and/or the public ledger 114.

Energy management decision records and/or other data records (that may comprise time series data) communicated from the gateway 104 to the public ledger 114 and/or the private database 116. This may include data records communicated from the gateway 104 to the public ledger 114 that is extrinsic to the transaction ecosystem (e.g., connected device data that a customer would like the energy retailer 102 to manage for them such as backup configurations and/or other information).

Information communicated from the gateway 104 to the customer control application 106 and/or another database backing the control application 106.

Messages (e.g., key management messages such as security association management protocol messages) issued by the identification and credential management service 110 establishing trust and security among the various devices, systems, services, entities, roles, components, and/or stakeholders.

Authenticated assertions from authorities associated with various devices, systems, services, entities, roles, components, and/or stakeholders for credential certification and/or public key authentication.

In certain embodiments, various information (e.g., pricing information, device, transaction, state, configuration data, and/or the like) may be collected, generated, communicated, and/or otherwise managed by one or more trusted components executing on the connected devices 100, the gateway 104, and/or any other devices, systems, services, entities, roles, components (e.g., applications), and/or stakeholders. In some embodiments, the trusted components may be installed on associated systems and/or devices at a time of manufacture. In further embodiments, the trusted components may be installed on the connected devices 100 and/or other devices and/or systems at the direction of an associated user. Among other things, the trusted components may be configured to establish secure connection between the various devices, systems, services, entities, roles, components, and/or stakeholders to enable secure communication of information in connection with the various applicable dataflows.

In certain embodiments, a trusted component that may comprise a personal agent executing on the one or more connected devices 100, the gateway 104, the customer control application 106, and/or associated systems and/or services, such as that described in U.S. patent application Ser. No. 12/785,406, filed May 21, 2010, may be used to collect, store, and/or otherwise manage various collected and/or generated data. In certain embodiments, privacy considerations may be maintained because only the personal agent may have direct access to certain confidential information. Users and/or stakeholders in such data may have control over what information is exposed from the personal agent to other entities.

A personal agent may be implemented in a variety of ways to collect, store, and/or manage confidential data. In some embodiments, a personal agent may be implemented as an agent that runs locally on a connected device 100 such as a background service configured to monitor events and collect information from a variety of sources. In further embodiments, a personal agent may be implemented as a network service that interacts with services and collects various information of interest.

In some embodiments, information collection and/or sharing through a personal agent may be controlled to protect a user's privacy. User privacy may be protected in a variety of ways. A personal agent may support interfaces where a system and a user can specify a policy defining what data can be captured and/or for what purposes the information can be used. For example, in some embodiments, a personal agent may provide users with the capability to opt-out of operational data collection and/or the drawing of certain inferences from collected operational data.

Data may be stored and/or managed by a personal agent in a secure manner. For example, a personal agent may utilize encrypted databases and/or data stores to store collected operational data. Moreover, personal agent services running in the cloud may use enterprise service level security to protect operational data. By interfacing with a personal agent associated with their connected devices 100 (e.g., using a control application 106 or the like), a user may view, edit, and/or remove their data from storage and/or collection, agree to share their data and provide conditions associated with such sharing, view what data they are sharing, identify with whom they are sharing it, and see what value they are provided in exchange, and/or the like.

The connected devices 100, energy retailer 102, gateway(s) 104, customer devices 108, identification and/or credential management service 110, device suppliers 112, public ledger 114, private database 116, regulators and/or third parties 118, trusted partners 120, and/or any other devices, systems, services, entities, roles, and/or components illustrated and described in connection with FIG. 1 may comprise and/or otherwise be associated with a variety of computing devices and/or systems, including any computing system or systems suitable to implement the systems and methods disclosed herein. For example, the connected devices 100, energy retailer 102, gateway(s) 104, customer devices 108, identification and/or credential management service 110, device suppliers 112, public ledger 114, private database 116, regulators and/or third parties 118, trusted partners 120, and/or any other devices, systems, services, entities, roles, and/or components may comprise a variety of computing devices and systems, including laptop computer systems, desktop computer systems, server computer systems, distributed computer systems, smartphones, tablets, and/or the like.

The connected devices 100 may further comprise any of the types of device disclosed herein. It will be appreciated that any suitable configuration of computing systems and storage media could be used in connection with the systems including, without limitation, a single server or duster of servers, or a distributed collection of heterogeneous computer systems connected by a variety of networks (e.g., such as the Internet, public and/or private networks, and/or the like).

In certain embodiments, the various devices, systems, services, entities, roles, and/or components may comprise at least one processor system configured to execute instructions stored on an associated non-transitory computer-readable storage medium. As discussed in more detail below, the various devices, systems, services, entities, roles, and/or components may further comprise a secure processing unit ("SPU") configured to perform sensitive operations such as trusted credential and/or key management, secure policy management and/or enforcement, and/or other aspects of the systems and methods disclosed herein. The devices, systems, services, entities, roles, and/or components may further comprise software and/or hardware configured to enable electronic communication of information between the devices, systems, services, entities, roles, and/or components via one or more networks (e.g., network) using any suitable communication technology and/or standard.

In certain embodiments, the various devices, systems, services, entities, roles, and/or components may be communicatively coupled via one or more network connections (e.g., network connections of a network). The network connection(s) may comprise a variety of network communication devices and/or channels and may utilize any suitable communication protocols and/or standards facilitating communication between the various systems. The network connections may comprise the Internet, a local area network, a virtual private network, and/or any other communication network utilizing one or more electronic communication technologies and/or standards (e.g., Ethernet or the like). In some embodiments, the network may comprise a wireless carrier system, such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Speciale Mobile ("GSM"), frequency division multiple access ("FDMA"), and/or time divisional multiple access ("TDMA") standards. In certain embodiments, the network connections may incorporate one or more satellite communication links. In yet further embodiments, the network connections utilize IEEE's 802.11 standards, Bluetooth®, ultra-wide band ("UWB"), Zigbee®, and/or any other suitable standard or standards.

It will be appreciated that a number of variations can be made to the architecture and relationships presented in connection with FIG. 1 within the scope of the inventive body of work. For example, without limitation, in some embodiments, some or all of the functions performed by the illustrated devices, systems, services, entities, roles, and/or components may be performed by a single system and/or any suitable combination of systems. Thus it will be appreciated that FIG. 1 is provided for purposes of illustration and explanation, and not limitation.

Figure 3:
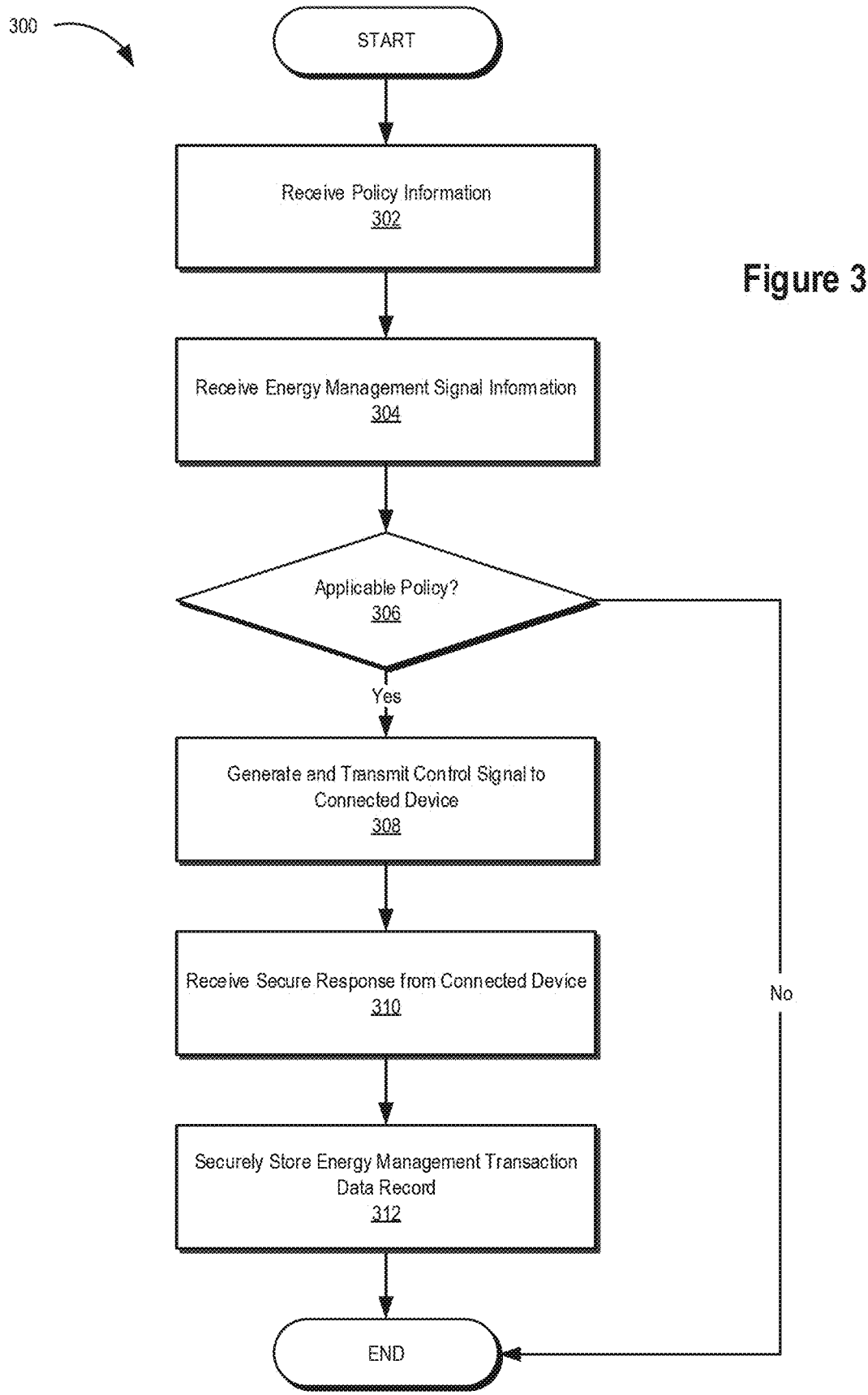
FIG. 3 illustrates a flow chart of an example of a method for managing information received by one or more connected devices by a gateway consistent with embodiments disclosed herein.

FIG. 3 illustrates a flow chart of an example of a method 300 for managing information received by one or more connected devices by a gateway consistent with embodiments disclosed herein. The illustrated method 300 may be implemented in a variety of ways, including using software, firmware, hardware, and/or any combination thereof. In certain embodiments, various aspects of the method 300 may be performed by a gateway device in connection with a customer system and/or control application, one or more connected devices, an energy management system (e.g., an energy retailer system), and/or one or more data stores (e.g., a public ledger and/or a private database) and/or any other suitable system and/or combination of systems.

At 302, policy information may be received at a gateway device from a customer system. For example, a customer may interact with a control application executing on an associated system to provide the gateway device with policy and/or other configuration information. In some embodiments, the policy information may articulate one or more control actions to be performed by one or more connected devices associated with the customer in response to the occurrence of one or more conditions.

In some embodiments, the connected devices may comprise one or more load devices such as, for example and without limitation, a connected thermostat, a connected furnace, a connected AC system, a connected irrigation control system, a pump system, a network gateway, a media system, a connected appliance, and a connected vehicle. The connected devices may further comprise one or more energy generation systems such as, for example and without limitation, a solar energy generation system, a wind energy generation system, and a hydroelectric energy generation system. In certain embodiments, the one or more connected devices may comprise at least one energy storage system such as, for example and without limitation, a battery storage system, a thermal sink, and a potential energy storage system. In yet further embodiments, the connected devices may comprise at least one control device configured to control a separate connected device (e.g., a thermostat controlling an AC unit and/or the like).

The gateway device may further receive from an energy management system such as, for example, an energy retailer system, energy management signal information at 304. In some embodiments, this signal information may comprise pricing data and/or associated information (e.g., current pricing data, future pricing data, discount information, and/or the like). In some embodiments, such pricing data may vary over time and/or otherwise be associated with a temporal component and/or period based, for example, on current and/or predicted grid demand.

A determination may be made at 306 whether the received energy management signal information triggers one or more conditions associated with the received policy information. If no policy condition is triggered, the method 300 may terminate. If, however, a policy condition is triggered, the method may proceed to 308.

At 308, the gateway device may identify at least one control action of the one or more control actions articulated in the policy information based on the one or more conditions articulated in the received policy information trigged by the received energy management signal information. For example, the energy management signal information may comprise pricing data indicating a price of energy for a certain period of time. The policy information may articulate a condition that if a received pricing signal indicates a price of energy that exceeds a threshold, one or more connected devices should be powered down and/or otherwise be directed to enter a power saving mode.

In some embodiments, a gateway device may implement one or more "software circuit breakers" in the form of a program that may evaluate possible actions to determine if those actions fit within safety parameters (e.g., parameters that may be associated with a device) and/or to determine whether those actions comply with policies set by and/or on behalf of the user. These circuit breakers can evaluate the status and/or recent history of a collection of devices supervised by a gateway device to determine whether certain actions should be countervailed and/or modified.

In at least one non-limiting example, pricing data received by a gateway device may fluctuate between 9.99 and 10.04 cents/kwh. A policy associated with a connected device managed by the gateway device may be triggered at 10 cents/kwh. In certain connected devices, however, including equipment like large motors, refrigeration equipment and/or associated compressors, or large industrial ovens, frequent changes in control settings and/or control action triggers may be cost ineffective, or at worst, even damaging to the equipment due to rapid on/off fluctuations triggered by policy. Consistent with various aspects disclosed herein, the gateway device may consider technical policy data that may be set by a customer and/or otherwise associated with a device (e.g., programmed at the time of manufacture) and/or or can be retrieved from a trusted manufacturer source to provide additional data for a gateway device to make intelligent and informed policy decisions.

The gateway device may generate and transmit a control signal to at least one connected device of the one or more connected devices at 310 responsive to the identified control action. For example, in various embodiments, the control signal may direct the at least one connected device to perform the at least one control action identified at 308.

At 310, a secure response may be received from the at least one connected device in response to the issued control signal. In some embodiments, the secure response may indicate that the at least one connected device performed the identified control action included in the control signal sent to the device. In certain embodiments, the secure response may be authenticated by the gateway based, at least in part, on verifying a cryptographic signature securely associated with the response. In some embodiments, commands and/or other action requests issued by a gateway device may comprise identifiers that can be referenced by the connected devices in providing responses, subsequent responses, and/or other notifications whereby a connected device declares a modification of behavior (e.g., immediately and/or subsequently) responsive to a command and/or request.

An energy management transaction data record may be generated and securely stored at 312. Consistent with various disclosed embodiments, the energy management decision data record may comprise one or more of the energy management signal information, the secure response, associated policy information, control action information, identification information relating to a controlled connected device, and/or any other device data, pricing data, transaction data, state data, configuration data, and/or any other relevant data described herein.

In some embodiments, the data management transaction record may be stored in one or more remote data stores. In certain embodiments, the data management transaction record may comprise a confidential component that may be stored in a private database and a public component that may be stored in a public ledger, which may comprise a blockchain ledger. In some embodiments, storing the confidential component may include storing the entire energy management transaction data record in the private database. In further embodiments, storing the public component may include storing the public component and a hash of the entire energy management transaction data record in the public ledger.

Figure 4:
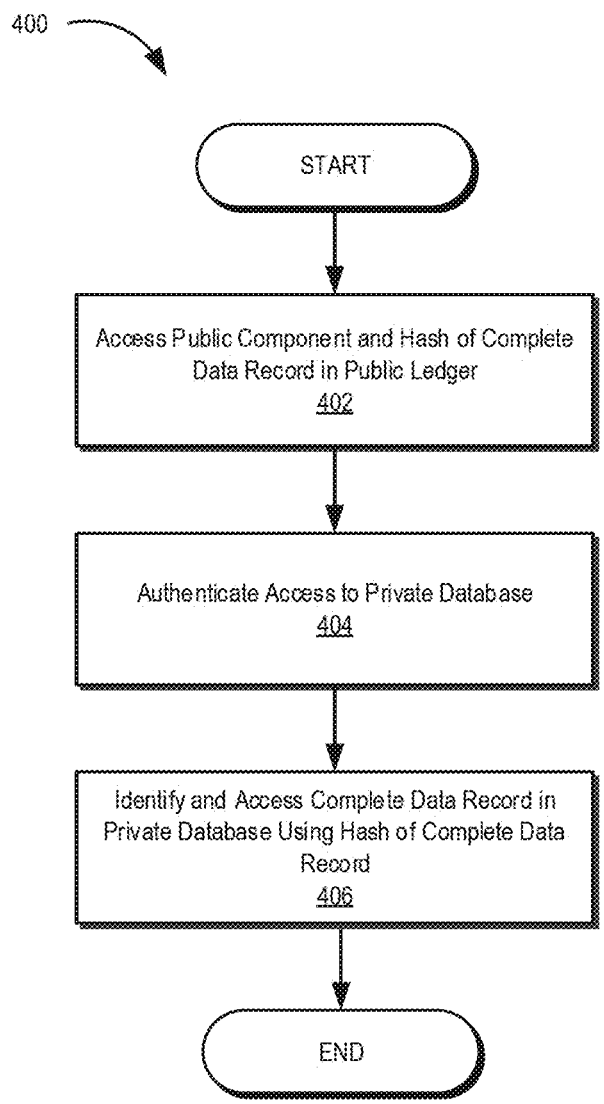
FIG. 4 illustrates a flow chart of an example of a method of accessing a public and a private component of a data record consistent with certain embodiments of the present disclosure.

FIG. 4 illustrates a flow chart of an example of a method 400 of accessing a public and a private component of a data record consistent with certain embodiments of the present disclosure. The illustrated method 400 may be implemented in a variety of ways, including using software, firmware, hardware, and/or any combination thereof. In certain embodiments, various aspects of the method 400 may be performed by, for example, a trusted partner, an authorized regulator, and/or a customer interested in accessing information included in a data management decision record.

At 402, a public component of a data record and a cryptographic hash of the complete data record may be accessed by a system from a public ledger. The system may, at 404, authenticate access with a private database (e.g., by presenting valid authentication credentials and/or the like). Once authenticated, at 406, the hash of the complete data record may be used to identify the complete data record in the private database using an index associating the hash with the complete data record.

Figure 5:
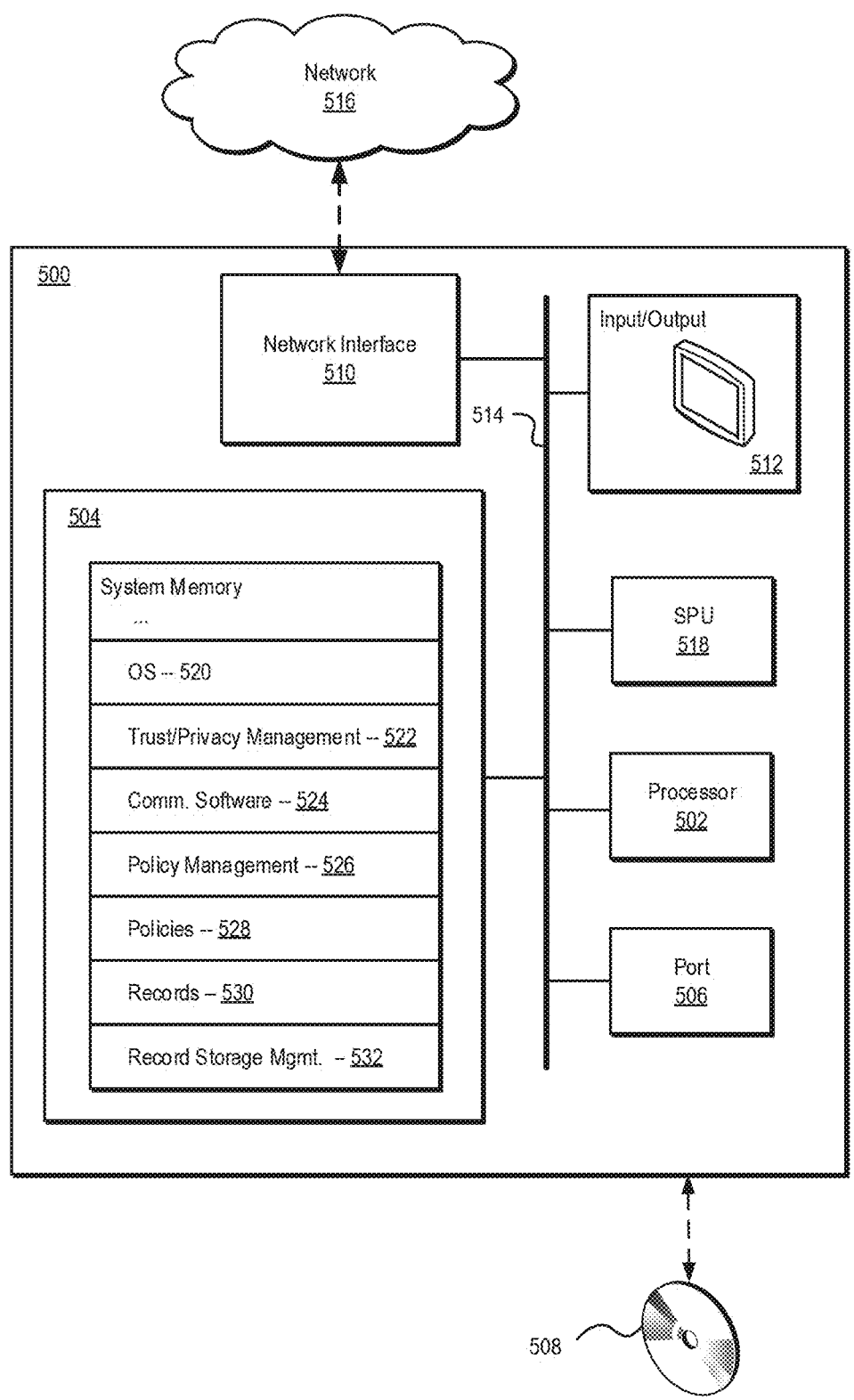
FIG. 5 illustrates an exemplary system that may be used to implement embodiments of the systems and methods of the present disclosure.

FIG. 5 illustrates an exemplary system 500 that may be used to implement embodiments of the systems and methods of the present disclosure. Certain elements associated with the illustrated exemplary system 500 may be included in one or more systems configured to perform certain energy and/or other transaction management methods in connection with one or more connected devices consistent with embodiments of the disclosed systems and methods. For example, various elements included in the illustrated system 500 may be included in a gateway device configured to receive policies, energy management signal information, and responses from connected devices, generate control signals based on applicable policies, and report various collected and/or generated information to a secure data store.

As illustrated in FIG. 5, the system 500 may include: a processing unit 502; system memory 504, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit; a port 506 for interfacing with removable memory 508 that may include one or more diskettes, optical storage mediums, and/or other non-transitory computer-readable storage mediums (e.g., flash memory, thumb drives, USB dongles, compact discs, DVDs, etc.); a network interface 510 for communicating with other systems via one or more network connections 516 using one or more communication technologies; a user interface 512 that may include a display and/or one or more input/output devices such as, for example, a touchscreen, a keyboard, a mouse, a track pad, and the like; and one or more busses 514 for communicatively coupling the elements of the system 500.

In some embodiments, the system 500 may, alternatively or in addition, include an SPU 518 that is protected from tampering by a user of the system or other entities by utilizing secure physical and/or virtual security techniques. An SPU 518 can help enhance the security of sensitive operations such as personal information management, trusted credential and/or key management, privacy and policy management, and other aspects of the systems and methods disclosed herein. In certain embodiments, the SPU 518 may operate in a logically secure processing domain and be configured to protect and operate on secret information, as described herein. In some embodiments, the SPU 518 may include internal memory storing executable instructions or programs configured to enable the SPU 518 to perform secure operations, as described herein.

The operation of the system 500 may be generally controlled by a processing unit 502 and/or an SPU 518 operating by executing software instructions and programs stored in the system memory 504 (and/or other computer-readable media, such as removable memory 508). The system memory 504 may store a variety of executable programs or modules for controlling the operation of the system 500. For example, the system memory 504 may include an operating system ("OS") 520 that may manage and coordinate, at least in part, system hardware resources and provide for common services for execution of various applications and a trust and privacy management system 522 for implementing trust and privacy management functionality including protection and/or management of personal data through management and/or enforcement of associated policies. The system memory 504 may further include, without limitation, communication software 524 configured to enable in part communication with and by the system including establishing secure communication channels with other systems (e.g., connected devices, energy management systems, customer systems, data stores, etc.); one or more applications; policies 528 and/or other configuration information; records 5230 that may include energy management decision records; and/or a record storage management module 532 to securely store records in one or more data stores (e.g., a private database and/or a public database and/or ledger) consistent with the disclosed embodiments; and/or any other information, modules; and/or any other applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for validating record information performed by a system comprising a processor and a non-transitory computer-readable medium storing instructions that, when executed by the processor, cause the system to perform the method, the method comprising:

accessing, from a public ledger, a public record associated with a first data record, the first data record comprising an energy management transaction data record comprising one or more of policy information applied by at least one connected device, at least one identified control action of at least one connected device that generated the energy management transaction data record, and identification information associated with at least one connected device that generated the energy management transaction data record, the first data record comprising a public component and a private component, the public record comprising the public component of the first data record and a hash generated based on at least the public component and the private component of the first data record;

generating, based at least in part on the accessed public record, a record validation query, the record validation query comprising the hash generated based on at least the public component and the private component of the first data record;

querying a private database with the record validation query;

receiving a validation response from the private database, the validation response indicating that the private database comprises a data record having a hash that corresponds to the hash generated based on at least the public component and the private component of the first data record; and authenticating the accessed public record based, at least in part, on the received validation response.

2. The method of claim 1, wherein the public ledger is managed by a remote service separate from the system.

3. The method of claim 1, wherein the public ledger comprises a blockchain ledger.

4. The method of claim 1, wherein the private database comprises a database managed by a remote service separate from the system.

5. The method of claim 4, wherein querying the private database with the record validation query comprises querying the remote service with the record validation query.

6. The method of claim 1, wherein the record validation query further comprises authentication credentials.

7. The method of claim 6, wherein receiving the validation response from the private database is based, at least in part, on a successful validation of the authentication credentials.

8. The method of claim 1, wherein the at least one connected device comprises at least one energy load device.

9. The method of claim 8, wherein the at least one energy load device comprises at least one of a thermostat, a furnace, an air conditioning system, an irrigation control system, a pump system, a network gateway, a media system, an appliance, and a vehicle.

10. The method of claim 1, wherein the at least one connected device comprises at least one energy generation system.

11. The method of claim 10, wherein the at least one energy generation system comprises at least one of a solar energy generation system, a wind energy generation system, and a hydroelectric energy generation system.

12. The method of claim 1, wherein the at least one connected device comprises at least one energy storage system.

13. The method of claim 12, wherein the at least one energy storage system comprises at least one of a battery storage system, a thermal sink, and a potential energy storage system.

14. The method of claim 1, wherein the at least one connected device comprises at least one control device.

15. The method of claim 1, wherein the at least one connected device comprises a device configured to manage an operation of another connected device.

* * * * *